(12) United States Patent
Adams

(10) Patent No.: US 8,099,602 B2
(45) Date of Patent: Jan. 17, 2012

(54) METHODS FOR INTEGRATING SECURITY IN NETWORK COMMUNICATIONS AND SYSTEMS THEREOF

(75) Inventor: Kyle Adams, West Henrietta, NY (US)

(73) Assignee: Mykonos Software, Inc., Rochester, NY (US)

( * ) Notice: Subject to any disclaimer, the term of this patent is extended or adjusted under 35 U.S.C. 154(b) by 680 days.

(21) Appl. No.: 12/284,950

(22) Filed: Sep. 26, 2008

(65) Prior Publication Data
US 2010/0082985 A1 Apr. 1, 2010

(51) Int. Cl.
*H04L 9/32* (2006.01)
*H04L 9/08* (2006.01)

(52) U.S. Cl. .................. 713/178; 713/176; 380/284

(58) Field of Classification Search .............. 713/178, 713/176; 380/277, 284, 285
See application file for complete search history.

(56) References Cited

U.S. PATENT DOCUMENTS

| | | | |
|---|---|---|---|
| 6,842,628 B1 * | 1/2005 | Arnold et al. | 455/556.2 |
| 7,328,348 B2 * | 2/2008 | Couillard | 713/178 |
| 7,366,905 B2 * | 4/2008 | Paatero | 713/175 |
| 7,370,197 B2 * | 5/2008 | Huitema | 713/162 |
| 7,542,571 B2 * | 6/2009 | Asadu | 380/277 |
| 7,783,887 B2 * | 8/2010 | Lewis et al. | 713/176 |
| 7,869,593 B2 * | 1/2011 | Beeson | 380/30 |
| 2002/0087862 A1 * | 7/2002 | Jain et al. | 713/176 |
| 2004/0030901 A1 * | 2/2004 | Wheeler et al. | 713/176 |
| 2006/0075247 A1 * | 4/2006 | Stevens | 713/178 |
| 2008/0222420 A1 * | 9/2008 | Serret-Avila | 713/176 |

* cited by examiner

*Primary Examiner* — Krisna Lim
(74) *Attorney, Agent, or Firm* — LeClairRyan, a Professional Corporation

(57) ABSTRACT

A method, computer readable medium, and system for integrating security in network communications includes generating a private key and a public key by encrypting the private key with a first encryption. The generated private key and public key are provided in an initial response to an initial request over the secure connection. At least one additional received request is validated based on the public key and a requesting signature signed using the key received with the at least one additional request. An additional response with a responding signature signed using the private key is provided in response to the validated additional request.

21 Claims, 2 Drawing Sheets

METHODS FOR INTEGRATING SECURITY IN NETWORK COMMUNICATIONS AND SYSTEMS THEREOF

FIELD OF THE INVENTION

The present invention generally relates to methods and systems for securing communications and, more particularly, to methods for integrating security in network communications and systems thereof.

BACKGROUND

Web applications routinely are under attack from malicious users that attempt to intercept information, hijack sessions, and attempt to undermine the application as a whole. Insecure applications can lead to customer loss, financial loss, damaged reputation and legal conflicts. As a result, it is extremely important to make security a top priority to ensure that all involved parties are protected from security vulnerabilities.

There are several types of attacks that are commonly deployed by malicious users on web applications. These commonly deployed attacks include session hijacking and man in the middle.

Session hijack attacks occur because malicious users understand that most web applications transmit the username and password over an SSL connection making it very difficult for a malicious user to obtain them. As a result, the malicious user may use a variety of different types of attacks, such as pattern recognition, brute force, or theft to break into a session.

With pattern recognition, the malicious user attempts to analyze how a session key is constructed and attempts to make logical guesses as to which keys might be valid. For example, a poor session implementation might use the current date and username as the session key (12132008joe). Such a key would be extremely easy to guess if the malicious user has a rough approximation of when the user logged in (possibly from a currently online list).

With brute force, the malicious user sequentially tests every possible session key looking for a successful response. The length of the session key greatly effects how feasible this attack is. If the session key is only 8-bits, then it would take less then 256 tries before a valid session were found. In contrast, if the session key were 32-bits, then it would take over 4 billion tries before a valid key could potentially be found (which means 4 billion HTTP connections).

With theft, the malicious user attempts to steal a valid session key from another user. Since cookies are commonly used to store the session key, there are countless ways to go about stealing session information without knowing anything about how sessions are managed. Once the malicious user has obtained the key, the malicious user can start accessing the server as that user (indefinitely if the malicious user is able to keep the session from expiring).

A man in the middle attack occurs when a malicious user places himself in the communication stream between the user and the server. The malicious user accepts requests from the client and passes them off to the server, as well as accepting responses from the server and passing them back to the client. As far as the client is concerned, it is communicating directly with the server, and as far as the server knows, it is communicating directly with the client. Such an attack allows malicious users to obtain sensitive information, or change data in the request to alter the effect of an operation (change the password in a set password API call for example). Stealing a session is also usually trivial once a man in the middle attack has been successfully launched. The following description better illustrates the flow of data in such a scenario.

In the first scenario, the client and server are sharing a secure communication. In the second scenario, communication between the client and server is being monitored and potentially manipulated by a malicious user. This risk can often be prevented by using SSL for all communication between the client and the server; however such a counter measure is extremely expensive both on response time and server processing resources.

Due to the types of information that are passed between client and server and the pervasiveness of malicious attacks, security is of utmost importance to developers and end users alike. Verification and authorization of the user combined with session validation are integral to ensuring security when utilizing a web application.

Traditionally, attacks have been thwarted by utilizing SSL encryption. SSL encryption encrypts everything going between the client and the server and, as a result, is a very slow process. Use of this form of encryption when passing large amounts of information results in poor user experience of applications due to the slow response of the server to inquiries or the sending of messages.

SUMMARY

A method for integrating security in network communications in accordance with embodiments of the present invention includes generating a private key and a public key by encrypting the private key with a first encryption. The generated private key and public key are provided in an initial response to an initial request over the secure connection. At least one additional request is validated based on the public key and a requesting signature signed using the private key received with the at least one additional request. An additional response with a responding signature signed using the private key is provided in response to the validated additional request.

A computer readable medium having stored thereon instructions for integrating security in network communications comprising machine executable code in accordance with other embodiments of the present invention includes comprises generating a private key and a public key by encrypting the private key with a first encryption. The generated private key and public key are provided in an initial response to an initial request. At least one additional request is validated based on the public key and a requesting signature signed using the private key received with the at least one additional request. An additional response with a responding signature signed using the private key is provided in response to the validated additional request.

A system that integrates security in network communications in accordance with other embodiments of the present invention includes a generation system, a communication system, and an authorization system. The generation system generates a private key and a public key by encrypting the private key with a first encryption. The communication system provides the generated private key and public key in an initial response to an initial request over the secure connection coupled to the communication system. The authorization system validates at least one additional request based on the public key and a requesting signature signed using the private key received with the at least one additional request. The communication system provides an additional response with a responding signature signed using the private key in response to the validated additional request.

The present invention provides a more effective method and system for integrating security within a web application. More specifically, the present invention prevents attacks of a web application by malicious users from being successful without requiring all information to be encrypted. As a result, the present invention increases the time in which information can be passed between a client system and an application server system over that of traditional encryption methods. Additionally, the present invention can be implemented in any programming language.

DETAILED DESCRIPTION

Figure 1:
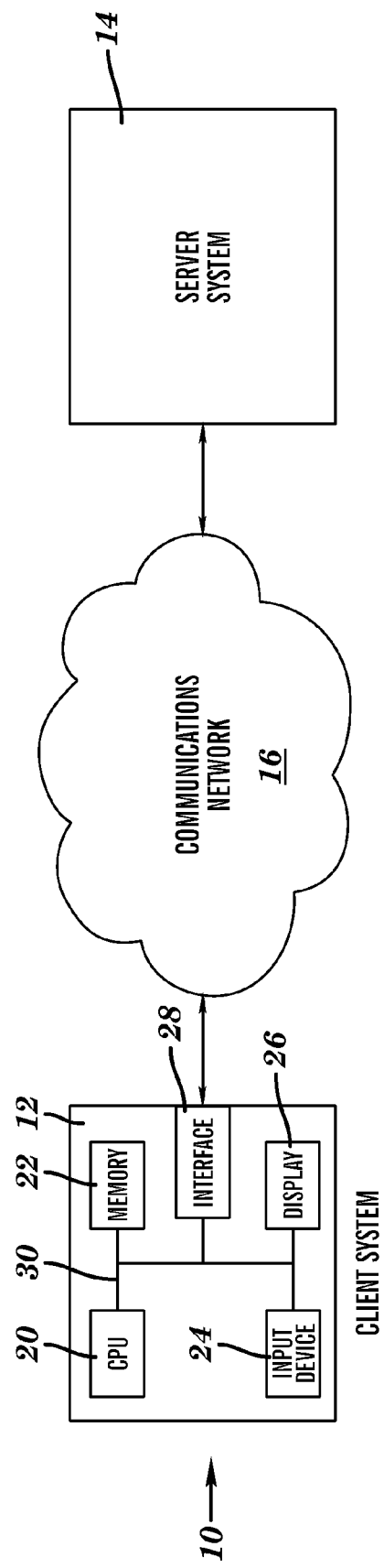
FIG. 1 is a block diagram of a system that integrates security in network communications in accordance with embodiments of the present invention.

A system 10 that integrates security in network communications in accordance with embodiments of the present invention is illustrated in FIG. 1. The system 10 includes a client system 12, a server system 14, and a communication network 16, although the system 10 can include other types and numbers of components connected in other manners. The present invention provides a more effective method and system for integrating security in network communications.

Referring more specifically to FIG. 1, the client system 12 is used to initiate and execute a secure session, although other types and numbers of systems could be used, such as application server 14, and other types and numbers of functions can be performed by the user computing system. The client system 12 includes a central processing unit (CPU) or processor 20, a memory 22, user input device 24, a display 26, and an interface system 28, and which are coupled together by a bus 30 or other link, although the client system 12 can include other numbers and types of components, parts, devices, systems, and elements in other configurations. The processor 20 executes a program of stored instructions for one or more aspects of the present invention as described and illustrated herein, although the processor could execute other numbers and types of programmed instructions.

The memory 22 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory 22.

The user input device 24 in the client system 12 is used to input selections, such as request to initiate and execute a secure session, although the user input device 24 could be used to input other types of data and interact with other elements. The user input device 24 can include a computer keyboard and a computer mouse, although other types and numbers of user input devices can be used. The display 26 in the client system 12 is used to show data and information to the user, such as data obtained during the secure session from the server system 14 by way of example only. The display 26 can include a computer display screen, such as a CRT or LCD screen, although other types and numbers of displays could be used.

The interface system 28 is used to operatively couple and communicate between the client system 12 and the server system 14 over a communication network 16, although other types and numbers of communication networks or systems with other types and numbers of connections and configurations to other types and numbers of systems, devices, and components can be used. By way of example only, the communication network 16 can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

The server system 14 also can be used to initiate and execute a secure session, although the server system 14 can perform other types and numbers of functions. The server system 14 includes a central processing unit (CPU) or processor, a memory, and an interface system which are coupled together by a bus or other link, although other numbers and types of each of the components and other configurations and locations for the components can be used. The processor in server system 14 executes a program of stored instructions for one or more aspects of the present invention as described herein. The memory in server system 14 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in server system 14. The interface system in server system 14 is used to operatively couple and communicate between the server system 14 and the client system 12, although other types of connections and other types and combinations of systems could be used.

Although embodiments of the client system 12 and server system 14 are described and illustrated herein, the user computing system 12 and server system 14 can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
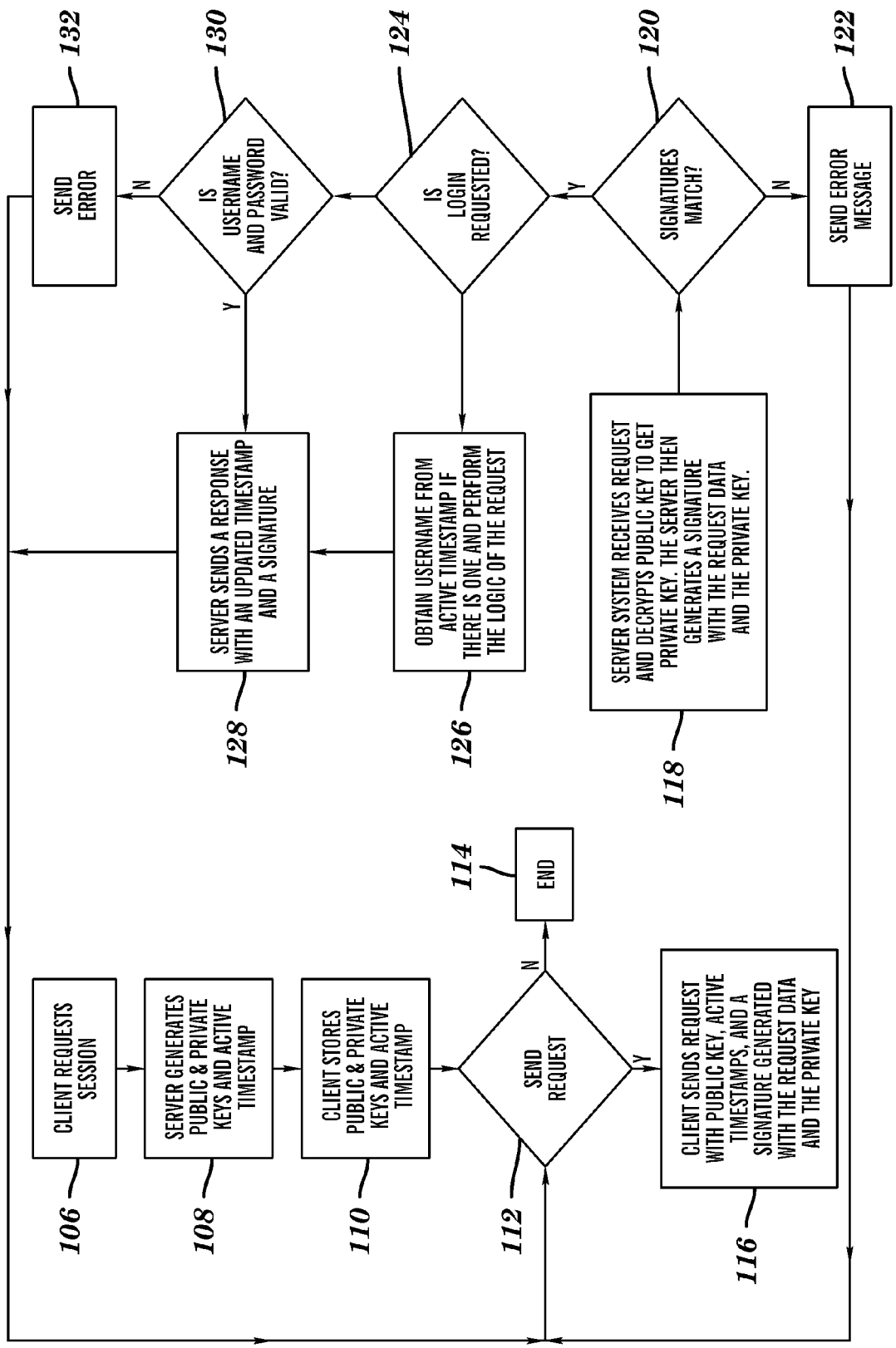
FIG. 2 is a flow chart of a method for integrating security in network communications in accordance with embodiments of the present invention.

The method for integrating security in network communications in accordance with the exemplary embodiments will now be described with reference to FIGS. 1-2. Although in this particular example, the processing steps described herein are substantially executed by the server system 14 as described below, some or all of these steps can be executed by other systems, devices, or components, such as by client system 12.

In step 106, the server system 14 receives an a request for a session from the client system 12 over an SSL connection to request the initiation of a session, although other types and amounts of login information could be requested in other manners and could be received by the server system 14 over other types and numbers of connections.

In step 108, in response to the request the server system 14 randomly generates a 95-bit integer that represents the private key and then generates a public key by encrypting the private key using a 256-bit AES encryption with an encryption key known only to the server system 14, although other manners for generating the private key and the public key, other methods for encrypting, and other numbers and types of keys can be used. Due to the properties of AES encryption, there is no way to derive the private key from the public key without knowing the 256-bit encryption key. As a result, the public key is only useful to the server system 14. To everyone else, including a malicious user, the public key is just a random 96-bit number.

In step 108, the server system 14 also sends the generated private key and public key to the client system 12 over the SSL connection, although other types and numbers of keys could be used and the session could be between other types and numbers of systems and devices. The following is an example of the response from the server system 14 when creating a new session:

```
<session>
    <privatekey>
        6e82f81fb4559bd6aa2d0fcad7ec4ca7023ce18cf2de87163
        31de640839fa9fe30b87ec3aefcf5b943f1bf1468d28cccdea
        47a0234557a76492c79d462a28909abad5b63e36fbd3c42
        bc86830d08b6faa1090adeecf7555a5231758a160c57
    </privatekey>
    <publickey>
        54322c34d71cd2bb52ff544623f833186bbc4ebe2d8b8906
        c342e6f8870d595801ec5307afde7de0f090ddb9b65a525d
        d4b8d6ec6f313ee5a21aedd8a7cbc9ed43492dd0dd13779
        7aeb1924d6aa296ce2e740d7630ef1d698b90312cd2fd2834
    </publickey>
<session>
```

Further, in step 108 the server system 14 creates and sends the client system 12 a new active timestamp by encrypting the current time and the currently logged in username with AES encryption key as follows:

timestamp=AES(unix_timestamp+":"+private_key+":"+username)

Although the username is illustrated above, the username is only added if the user at the client system 14 is logged in and can be left out in other embodiments. The server system 14 uses the same AES encryption key used to generate the public key from the private key. The resulting timestamp is a time sensitive token that represents the currently logged in user at the client system 12.

In step 110, the client system 12 receives and stores in memory the generated private key and the public key and new active timestamp from the server system 14, although the keys could be stored in other locations and manners.

In step 112, the client system 12 determines whether to send another request to the server system 14. If in step 112, the client system 12 determines there will be no additional requests, then the No branch is taken to step 114 where the session ends. If in step 112, the client system 12 determines there will be another request, then the Yes branch is taken to step 116.

In step 116, the client system 12 uses a hash function, such as the Message-Digest algorithm 5 (MD5) by way of example only, to generate a signature from the request and the private key to send with the request, although other methods can be used. Once the signature is generated, the client system 12 sends the generated signature along with the stored active timestamp, the public key, and the request to the server system 14 over a non-SSL connection, although other types and amounts of information in other combinations and over other connections can be used, such as an SSL connection. The following is an example of a request in which the public key, signature, stored active timestamp, and request are transmitted by the client system 12 to the server system 14:

```
<bundle format = "XML"pubkey =
        "54322c34d71cd2bb52ff544623f833186bbc4ebe2d8b890
        6c342e6f8870d595801ec5307afde7de0f090ddb9b65a52
        5dd4b8d6ec6f313ee5a21aedd8a7cbc9ed43492dd0dd13
        7797aeb1924d6aa296ce2e740d7630ef1d698b90312cd2fd2834"
        active = "e2413a9e5bca9d887f363af5c52287866
            5a4b606014c241dacfd3029359c7586">
    <signature id =
        "92577563">e496cd5d39df108c2d6b3ca66a9dfe8d</signature>
    <request application = "FileAccessService" id ="92577563"
        method="listDirectory"> <drive id="Interfaces" />
    </request>
</bundle>
```

The client system 12 does not transmit the private key with the new request because the server system 14 already knows how to convert the public key into the private key using the AES decryption algorithm, although other manners for obtaining the private key can be used. The public key is useless without the matching private key, preventing any malicious user who has obtained only the public key from hijacking this session.

In step 118, the server system 14 receives the request, the received signature, stored active timestamp, and the public key from the client system 12, although other types and amounts of information could be received. The server system 14 decrypts the public key into the private key using the AES decryption algorithm and uses the private key and the request in the signature to generate a validation signature, although the server system 14 can process the information in other manners. Additionally, the server system 14 uses the AES encryption key to decrypt the timestamp and then breaks the decrypted timestamp into its three original components: timestamp; private key; and username, although the server system 14 can process the timestamp in other manners and the inclusion of the username in the signature is optional.

In step 120, the server system 14 determines if the additional request is valid based on whether or not the received signature matches the validation signature, although other manners for validating the additional request which are based on other types and amounts of information can be used. More specifically, in these embodiments the server system 14 validates the received signature against the validation signature and ensures the timestamp is fresh enough to consider valid. In these embodiments, the time period for a timestamp to be considered to be fresh or valid, is usually if the timestamp has a time which is less than about an hour old, although other time periods could be used. If the server system 14 determines based on the check of the comparison of the received signature and the validation signature and the timestamp that the additional request is not valid, then the No branch is taken to step 122 where the server system 14 sends an error message to the client system 12 and then proceeds to step 112 described earlier.

If the server system 14 determines based on the check of the generated signature and decrypted and broken apart timestamp that the additional request is valid, then the server system 14 sets the username at client system 12 as the active user, executes the additional request, and takes the Yes branch to step 122. In step 122, the server system 14 returns a response to the additional request, along with an updated timestamp which is encrypted by the server system in the same manner as described earlier, although other types and amounts of information in other formats can be sent in the response. Once the additional response is sent as described in step 122, the method returns to step 112 as described in greater detail earlier.

Accordingly, as described and illustrated by the exemplary embodiment herein the present invention provides a more effective method and system for integrating security in network communications. With the present invention, traditional SSL encryption is only used in the initial authorization transmissions, after which the communication can be executed more quickly and efficiently over unsecure connections without concerns about the previously described attacks, although secure connections could be used.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for integrating security in network communications, the method comprising:
   generating a private key and a public key by encrypting the private key with a first encryption:
   providing the generated private key and public key in an initial response to an initial request over a secure connection, wherein the providing the generated private key and public key in response to the initial request further comprises providing an encrypted timestamp;
   generating the encrypted timestamp by encrypting a current time at a time of the initial response using the first encryption, wherein the generating the encrypted timestamp further comprises encrypting a current time at a time of the initial response and a username using the first encryption when the username is logged in, wherein the username is dropped when a first time period from the current time has expired;
   validating at least one additional request received based on the public key and a requesting signature signed using the private key received with the at least one additional request, wherein the validating is further based on the encrypted timestamp received with the at least one additional request; and
   providing an additional response with a responding signature signed using the private key in response to the validated additional request.

2. The method as set forth in claim 1 wherein the generating the private key further comprises randomly generating a multiple bit integer as the private key.

3. The method as set forth in claim 1 wherein the secure connection uses the secure socket layer protocol.

4. The method as set forth in claim 1 wherein the first encryption is advanced encryption standard.

5. The method as set forth in claim 1 wherein the validating based on the public key further comprises:
   decrypting the public key received with the at least one additional request using the first encryption to obtain a decrypted private key;
   generating a validation signature using the at least one additional request and the decrypted private key; and
   validating that the requesting signature and the validation signature match before the providing the additional response is permitted.

6. The method as set forth in claim 1 wherein the providing an additional response with a responding signature further comprises providing an updated, encrypted timestamp with the additional response.

7. The method as set forth in claim 6 further comprising generating the updated, encrypted timestamp by encrypting a current time at a time of the additional response using the first encryption.

8. A non-transitory computer readable medium having stored thereon instructions for integrating security in network communications comprising machine executable code which when executed by at least one processor, causes the processor to perform steps comprising:
   generating a private key and a public key by encrypting the private key with a first encryption;
   providing the generated private key and public key in an initial response to the initial request over a secure connection, the providing the generated private key and public key in response to the initial request further comprises providing an encrypted timestamp;
   generating the encrypted timestamp by encrypting a current time at a time of the initial response using the first encryption, wherein the generating the encrypted timestamp further comprises encrypting a current time at a time of the initial response and a username using the first encryption when the username is logged in, wherein the username is dropped when a first time period from the current time has expired; validating at least one additional request received based on the public key and a requesting signature signed using the private key received with the at least one additional request, wherein the validating is further based on the encrypted timestamp received with the at least one additional request; and providing an additional response with a responding signature signed using the private key in response to the validated additional request.

9. The non-transitory computer readable medium as set forth in claim 8 wherein the generating the private key further comprises randomly generating a multiple bit integer as the private key.

10. The non-transitory computer readable medium as set forth in claim 8 wherein the secure connection uses the secure socket layer protocol.

11. The non-transitory computer readable medium as set forth in claim 8 wherein the first encryption is advanced encryption standard.

12. The non-transitory computer readable medium as set forth in claim 8 wherein the validating based on the public key further comprises:
decrypting the public key received with the at least one additional request using the first encryption to obtain a decrypted private key;
generating a validation signature using the at least one additional request and the decrypted private key; and
validating that the requesting signature and the validation signature match before the providing the additional response is permitted.

13. The non-transitory computer readable medium as set forth in claim 8 wherein the providing an additional response with a responding signature further comprises providing an updated, encrypted timestamp with the additional response.

14. The non-transitory computer readable medium as set forth in claim 8 further comprising generating the updated, encrypted timestamp by encrypting a current time at a time of the additional response using the first encryption.

15. A system that integrates security in network communications, the system comprising:
a generation system generates a private key and a public key by encrypting the private key with a first encryption when an initial request over a secure connection is authorized, wherein the generation system generates the encrypted timestamp by encrypting a current time at a time of the initial response using the first encryption, wherein the generation system further comprises encrypting the current time at the time of the initial response and a username using the first encryption when the username is logged in wherein the username is dropped when a first time period from the current time has expired;
a communication system provides the generated private key and public key in an initial response to the initial request over the secure connection coupled to the communication system, wherein the communication system provides an encrypted timestamp with the generated private key and public key; and
an authorization system validates at least one additional request based on the public key and a requesting signature signed using the private key received with the at least one additional request, wherein the authorization system further validates based on the encrypted timestamp received with the at least one additional request;
the communication system provides an additional response with a responding signature signed using the private key in response to the validated additional request.

16. The system as set forth in claim 15 wherein the generation system generates the private key further comprises randomly generating a multiple bit integer as the private key.

17. The system as set forth in claim 15 wherein the secure connection coupled to the communication system uses the secure socket layer protocol.

18. The system as set forth in claim 15 wherein the first encryption used by the generation system is advanced encryption standard.

19. The system as set forth in claim 15 wherein the authorization system decrypts the public key received with the at least one additional request using the first encryption to obtain a decrypted private key, decrypts the requesting signature with the decrypted private key, and validates the decrypted requesting signature before the communication system is permitted to provide the additional response.

20. The system as set forth in claim 15 wherein the communication system provides the additional response with a responding signature further by providing an updated, encrypted timestamp with the additional response.

21. The system as set forth in claim 20 wherein the generation system generates the updated, encrypted timestamp by encrypting a current time at a time of the additional response using the first encryption.

* * * * *